(No Model.) F. L. CLARK. ANGLE COCK.

2 Sheets—Sheet 1.

No. 464,451. Patented Dec. 1, 1891.

WITNESSES: INVENTOR

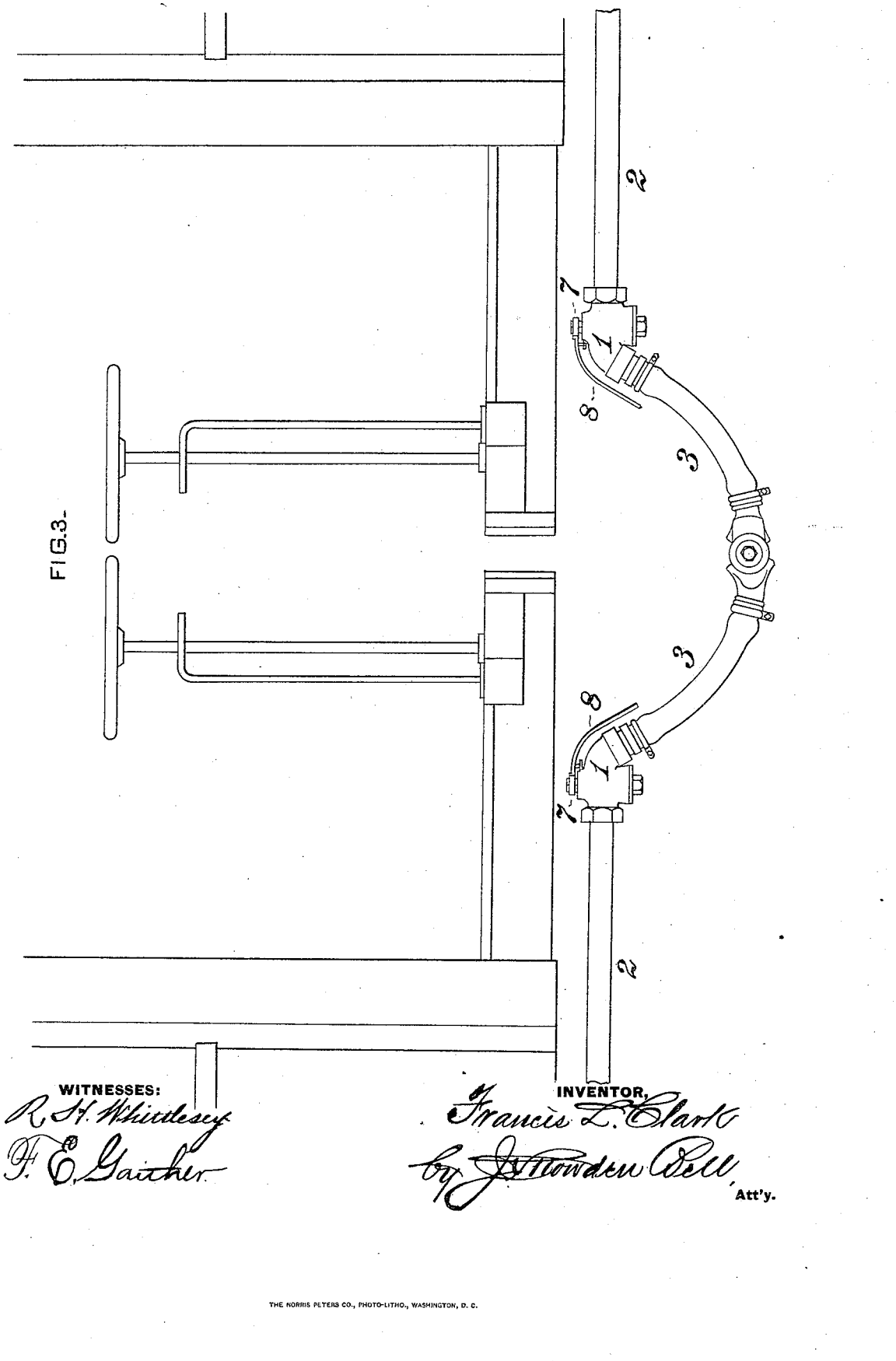

UNITED STATES PATENT OFFICE.

FRANCIS L. CLARK, OF SWISSVALE, ASSIGNOR TO THE WESTINGHOUSE AIR BRAKE COMPANY, OF PITTSBURG, PENNSYLVANIA.

ANGLE-COCK.

SPECIFICATION forming part of Letters Patent No. 464,451, dated December 1, 1891.

Application filed October 9, 1890. Serial No. 367,554. (No model.)

*To all whom it may concern:*

Be it known that I, FRANCIS L. CLARK, a citizen of the United States, residing at Swissvale, in the county of Allegheny and State of Pennsylvania, have invented or discovered a certain new and useful Improvement in Angle-Cocks for Brake-Pipe Connections, of which improvement the following is a specification.

The object of my invention is to provide an angle-cock for connecting the rigid and flexible sections of train air-brake pipes in which the liability of accidental displacement of the plug from open position may be reduced as far as practicable without affecting its capacity of ready manipulation, and by which the flexible hose may be connected to the rigid section of pipe in such manner as to preserve the full opening through the flexible hose without the employment of an additional short section of pipe between the cock at the end of the car and the flexible hose, to which end my invention, generally stated, consists in the combination, with a rigid section of train-pipe and a flexible hose, of a curved or angular body, the form of which corresponds to the direction and inclination of the rigid train-pipe and flexible hose, a plug provided with a transverse fluidway and fitted therein, and a handle connected to the plug in line with its fluidway and bent longitudinally in substantial accordance with the curvature or inclination of the body.

The improvement claimed is hereinafter fully set forth.

Figure 1:
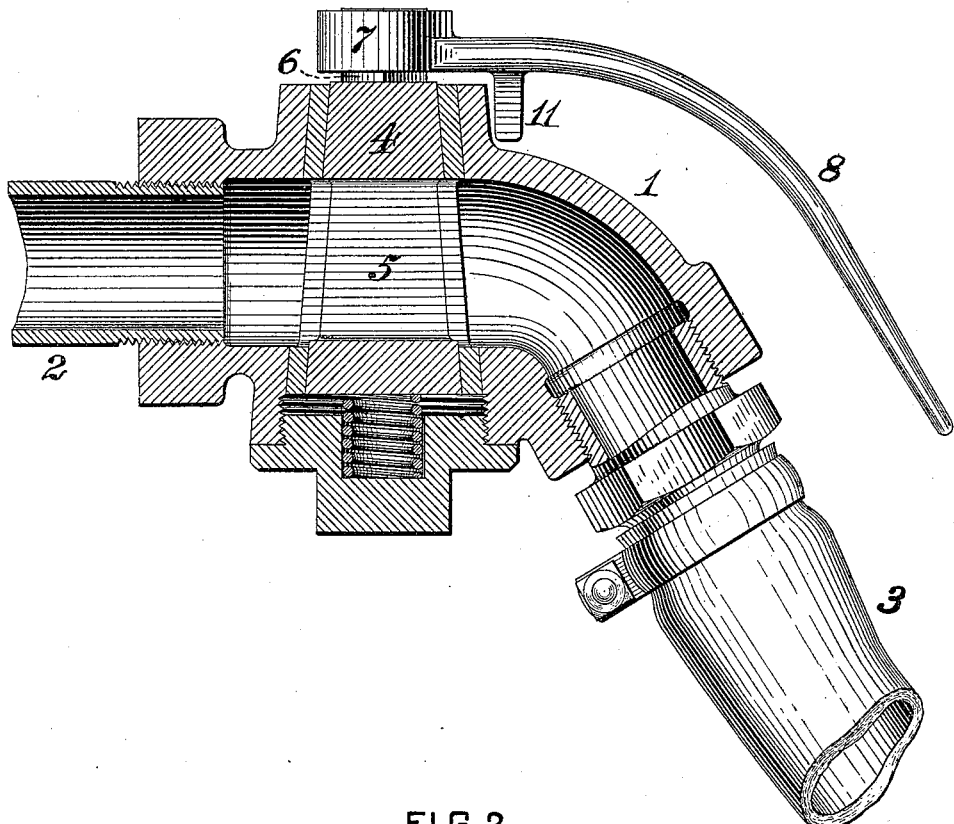
Figure 2:
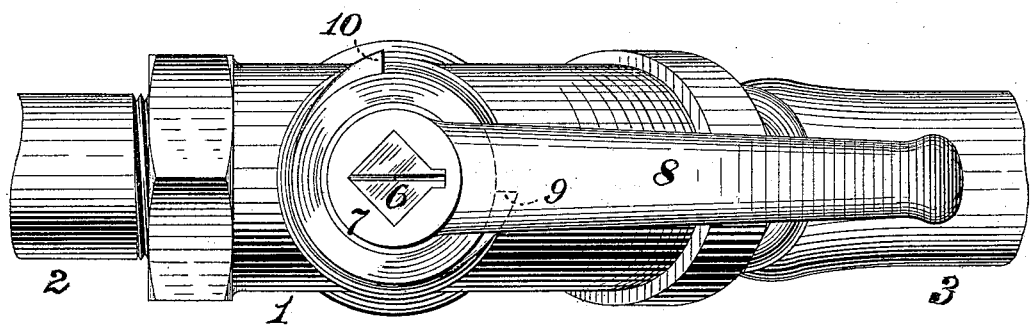

In the accompanying drawings, Figure 1 is a longitudinal central section through an angle-cock embodying my invention; Fig. 2, a plan or top view of the same; and Fig. 3, a side view in elevation of the end portions of the train-pipes of two railroad-cars, illustrating the application of my improvement.

In the practice of my invention I provide a body or shell 1 of longitudinally curved or angular form, and having its ends suitably adapted, as by being internally threaded, for connection to two lines of piping at an angle one to the other, in this instance a rigid pipe 2 and a flexible hose 3, which are coupled together by means of the body 1. A tapered or conical plug-cock 4, in which is formed a transverse fluidway or passage 5, is fitted truly and with the capacity of free axial rotation in the body 1, and accordingly as its fluidway is turned into line with or transversely to the longitudinal passage extending through the shell, serves to open or to close, as the case may be, communication through the body between the connected lines of piping. The end of the plug-cock, which projects outside of the body, is provided with a squared or flat sided bearing 6, upon which is fitted the head or boss 7 of an operating-handle 8, the head 7 having a recess or opening of corresponding form to and closely engaging the bearing 6 of the plug-cock. The center line of the handle 8, when the latter is connected to the plug-cock, lies in the plane of the fluidway 5 thereof, and the handle is longitudinally curved or bent in substantial correspondence with the curvature or angularity of the body 1, and in such relation to the head 7 that the handle shall be as near the periphery of the body, when moved into position to open the plug-cock, as will admit of being readily grasped by the operator. The range of traverse of the handle in moving the plug-cock from open to closed position, or vice versa, is regulated by stops 9 10, formed upon the outside of the body 1, a pin or projection 11 on the under side of the handle 8 abutting against one or the other of said stops when the handle is moved into position to fully open or to entirely close the plug-cock.

My improvement is more particularly designed for application under conditions of service in which the cock is normally kept open for the passage of air through the train-pipes and flexible hose of fluid-pressure-brake apparatus, and the handle being, when the cock is open, located immediately above and as close as practicable to the curved or inclined portion of the body or shell, it will be seen that it is correspondingly protected by the latter from displacement by contact with obstructions or moving parts which might under the ordinary construction be accidentally made with objectionable results.

Connections of this kind have been made in two ways: first, by employing a cock with a straight body placed in the line of rigid train-pipe some distance from the hose-connection and connecting the valve-body by means of a short section of straight pipe with the flexible hose. As the hose always hangs down at an inclination to the train-pipe, this method of connection causes a kink or sudden bend in the hose, which partly or wholly closes the passage through the hose and causes it to wear out rapidly. In the other method of connection a valve with a straight body is employed, and the short piece of pipe is placed between the valve and hose; but it is curved to conform to the direction of the inclination of the hose. In both of these arrangements the additional piece of pipe is necessary, and when it is a curved piece it requires the employment of an unnecessary additional part, which must be specially formed for the position it is to occupy. Besides these disadvantages, the additional short piece of pipe requires the placing of the valve too far back from the end of the car for convenience.

By my improvement the valve may be placed at the extreme end of the rigid section of pipe in a convenient position to be reached by the train-man, and the additional section of pipe is unnecessary. The flexible hose connection is made so as to preserve a full opening at all times through the hose, and as the valve is normally open—that is, when the train is running—the valve-handle being placed above and conforming closely to the form of the valve-body is protected from danger of being broken or moved to close the valve by flying stones or other substances, the number of joints necessary is diminished, and these results are secured by a single simple structure.

I claim as my invention and desire to secure by Letters Patent—

In an air-brake apparatus, the combination, with a rigid section of train-pipe and a flexible inclined end portion for conducting air under cars, of a curved or angular valve body or shell forming the connection between the two portions of the train-pipe, whereby the flexible hose may be connected directly to the valve-body without bending, and having a direct through passage curved to conform to the curvature of the valve-body and communicating permanently with the connected portions of the train-pipe, a plug-valve having a transverse fluidway and fitted to rotate in the body, and a handle located above the body or shell and connected with the plug in line with its fluidway and bent longitudinally in accordance with the curvature or inclination of the body, so that when the port is open the handle is above and in line with the pipe, substantially as set forth.

In testimony whereof I have hereunto set my hand.

FRANCIS L. CLARK.

Witnesses:
J. SNOWDEN BELL,
R. H. WHITTLESEY.